Jan. 11, 1938.   E. WILDHABER ET AL   2,105,104
GEAR
Filed Oct. 13, 1936   2 Sheets-Sheet 1
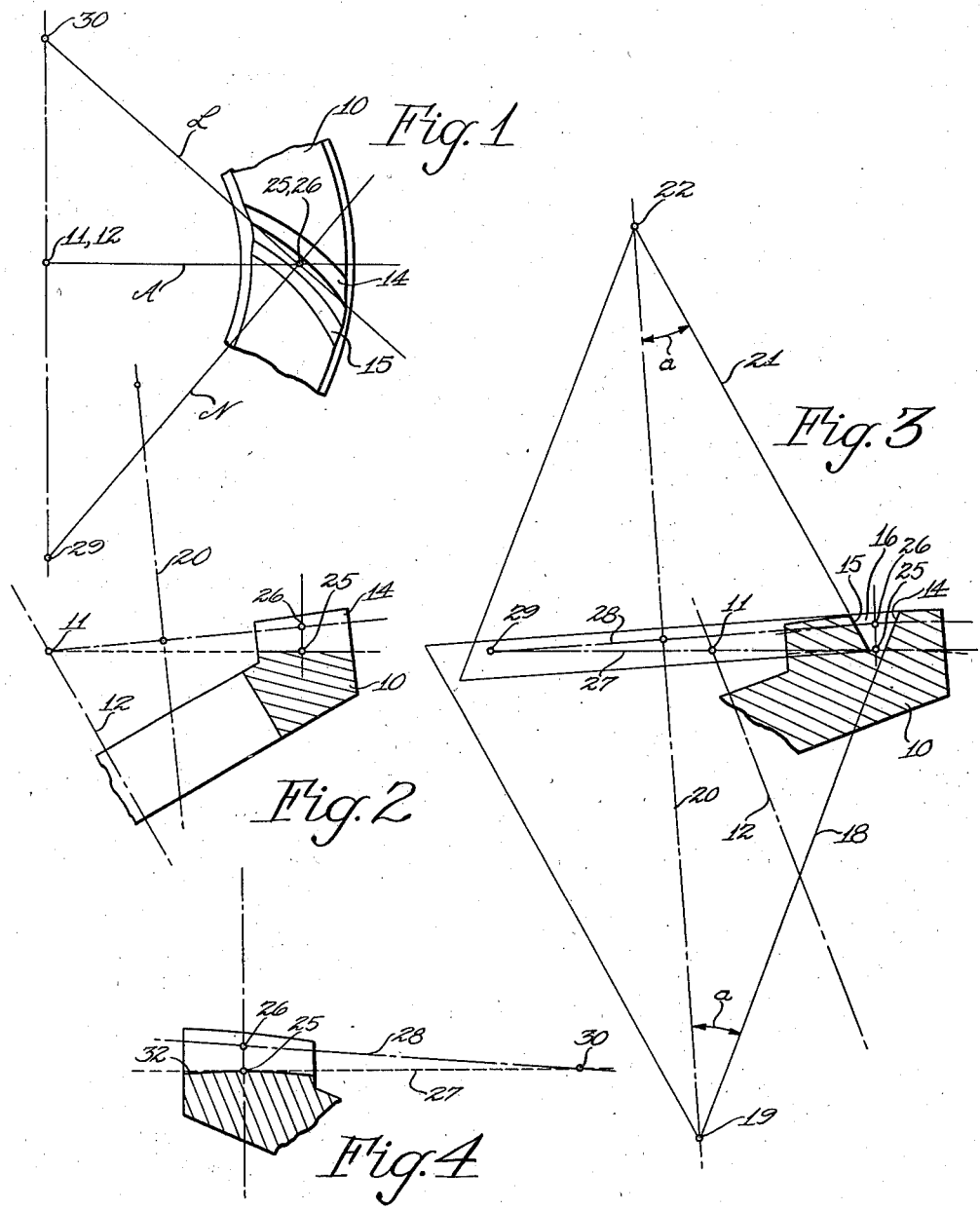
Inventors
Ernest Wildhaber
and Allan H. Candee
By
Schlesinger
their Attorney Jan. 11, 1938. E. WILDHABER ET AL 2,105,104
GEAR
Filed Oct. 13, 1936  2 Sheets-Sheet 2
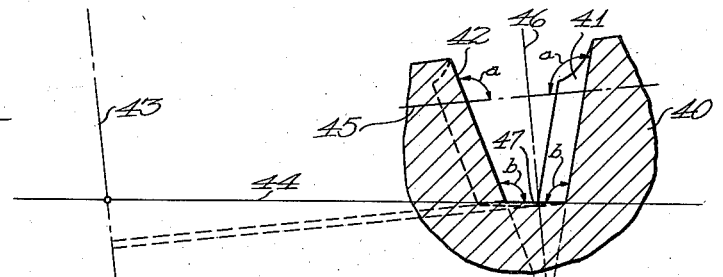
Fig. 5
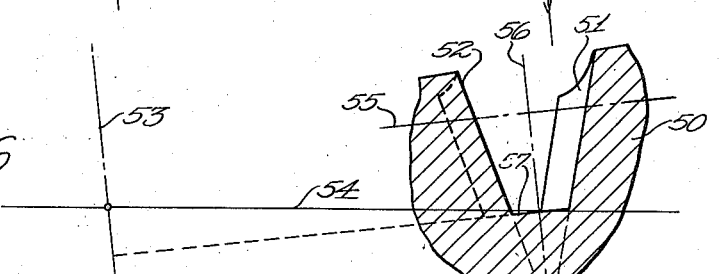
Fig. 6
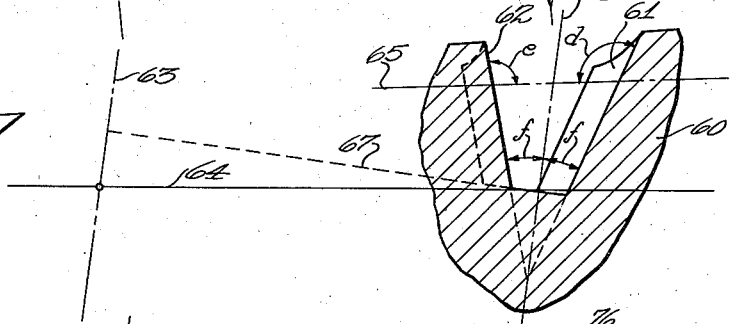
Fig. 7
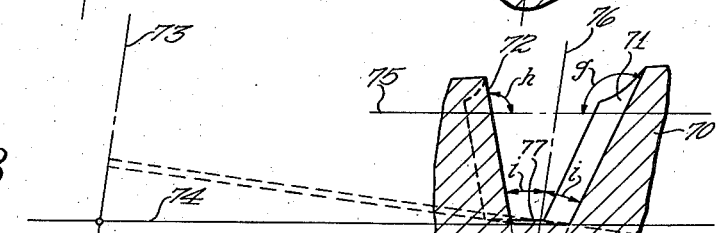
Fig. 8
Fig. 9
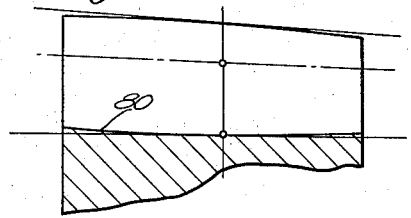
Inventors
Ernest Wildhaber
and Allan H. Candee
By
their Attorney Patented Jan. 11, 1938

2,105,104

UNITED STATES PATENT OFFICE 2,105,104

GEAR

Ernest Wildhaber, Irondequoit, and Allan H. Candee, Rochester, N. Y., assignors to Gleason Works, Rochester, N. Y., a corporation of New York Application October 13, 1936, Serial No. 105,384

17 Claims. (Cl. 74—459.5)

The present invention relates to gears and more particularly to tapered gears of the non-generated or "Formate" type with longitudinally curved teeth.

The primary object of the present invention is to provide a type of non-generated or 'Formate" spiral bevel or hypoid gear which can be produced more economically and more efficiently than any type of such gear heretofore produced. To this end, it is a purpose of the invention to provide a type of spiral bevel and hypoid non-generated or "Formate" gear which can be produced readily upon existing gear cutting or grinding machinery but which does not require, as heretofore, use of different tools for gears of different dedendum or different spiral angles or different tooth numbers.

In the drawings:

Fig. 1 is a fragmentary plan view of a spiral bevel or hypoid gear made according to the present invention;

Fig. 2 is a fragmentary axial section through the gear such as might be taken, for instance, on the line A of Fig. 1;

Fig. 3 is a section through the gear taken normal to a tooth space, that is, a section such as might be taken on the line N of Fig. 1;

Fig. 4 is a section through the gear taken lengthwise of a tooth space of the gear, a section such as might be taken on the line L of Fig. 1;

Fig. 5 is a view similar to Fig. 3 but on an enlarged scale and showing a fragmentary normal section of a tooth space of a spiral bevel gear made according to one embodiment of the invention and having the bottom lands of its tooth spaces lying in the root plane of the gear;

Fig. 6 is a view similar to Fig. 5 but showing a normal section of a spiral bevel gear made according to another embodiment of the invention in which the bottom lands of the tooth spaces of the gear are equally inclined to the opposite sides of the tooth spaces;

Fig. 7 is a normal section through a hypoid gear made according to one embodiment of this invention in which the bottom lands of the tooth spaces of the gear are equally inclined to the opposite sides of the spaces;

Fig. 8 is a normal section of a hypoid gear made according to a different embodiment of the invention and in which the bottom lands of the tooth spaces of the gear lie in the root cone of the gear; and Fig. 9 is a view similar to Fig. 4 and on an enlarged scale showing a longitudinal section of a hypoid gear made according to this invention.

Gears made according to the present invention have teeth which are curved longitudinally along circular arcs and have side surfaces which are portions of surfaces of revolution. The side surfaces of the teeth are preferably made of straight profile and therefore conical. Preferably, also, the opposite sides of a tooth space of the gear are made coaxial. A salient feature of the present invention is that the side surfaces of a tooth space of the gear are surfaces of revolution whose axis is inclined at other than a right angle to the root plane of the gear. A further characteristic of the invention is that the tooth surfaces of the gears are of equal pressure angle referred to such axis. Spiral bevel gears made according to the invention have convex tooth bottoms considered longitudinally of the teeth and hypoid gears have concave tooth bottoms. Each tooth bottom land may consist of a plane perpendicular to the axis of revolution of the sides of a tooth space or it may be a portion of a cone coaxial with the sides of the space and extending in a direction tangent to the root cone of the gear.

Gears made according to the present invention have distinct advantages over prior forms of non-generated spiral bevel or hypoid gears. They can be produced on existing spiral bevel or hypoid gear cutting or grinding machines with face-mill gear cutters or grinding wheels whose opposite side-cutting edges or grinding profiles have equal pressure angles. This means that any spiral bevel or hypoid gear of the type covered by the present invention, regardless of its spiral angle or dedendum angle, may be cut or ground on existing equipment with a single cutting tool, or grinding wheel so long as the radius of curvature of its teeth fall within the range of that cutter or the radial adjustment of the wheel on the grinding machine.

With prior types of non-generated spiral bevel and hypoid gears, it would have been necessary to employ machines of the generating type having provision for tilting the cutter if it were sought to cut such gears, regardless of spiral angle or dedendum angle with a single cutting tool. If previous methods were employed for cutting non-generated gears on existing machines having no cutter tilt, it would be necessary to use a different cutter with each change in spiral or dedendum angle.

Generating machines are expensive and lack the rigidity for high-speed production of non-generated gears. It is likewise costly to maintain a supply of cutters of different pressure angles to cut gears of different spiral or dedendum angles on existing form-cutting machines. The present invention, then, permits of very material reductions in gear costs.

Reference will now be had to the drawings for a more detailed description of the invention. 10 denotes a tapered gear, spiral bevel or hypoid, made according to this invention. The apex of the gear is denoted at 11 and its axis at 12. The gear has longitudinally curved teeth which taper in depth from their outer to their inner ends.

The teeth are curved longitudinally along circular arcs and their side surfaces are surfaces of revolution. In the preferred embodiment of the invention, the side surfaces are conical and the adjacent sides of teeth bounding a given tooth space are coaxial. Thus, as shown in the drawings, the opposite side surfaces 14 and 15 of the tooth space 16 of the gear 10 are conical surfaces of different radii but with a common axis. The side surface 14 of the tooth space 16 is a portion of the surface of a cone 18 whose apex is at 19 and whose axis is at 20. The side surface 15 of the tooth space 16 is a portion of the surface of a cone 21 whose apex is at 22 and whose axis coincides with the axis 20 of the cone 18.

The side surfaces 14 and 15 of the tooth space 16 are such, then, as might be cut by a standard face-mill gear cutter having inside and outside cutting blades whose cutting edges are of straight profile and which are adapted to cut opposite sides of a tooth space simultaneously.

Heretofore, non-generated spiral bevel and hypoid gears have been cut with tools whose opposite side cutting edges have been of unequal pressure angle referred to the root plane of the gear or the axis of the cutter and the cutter has been positioned so that its axis is perpendicular to the root plane of the gear, thereby to produce tooth surfaces on the gear of equal pressure angle referred to the pitch plane of the gear. Thus, the opposite side surfaces of the tooth spaces of non-generated tapered gears as previously cut were coaxial conical surfaces whose axis was at right angles to the root plane of the gear and they were of unequal pressure angle referred to the root plane, but of equal pressure angle referred to the pitch plane.

In the drawings, 25 denotes a mean-point in the root plane 27 of the gear and 26 a mean-point in the pitch plane 28 of the gear. The root plane is a plane tangent to the root cone of the gear at a mean-point in the face of the gear and the pitch plane is a plane tangent to the pitch cone also at a mean point. The angle between the two planes is the dedendum angle of the gear. The intersection of these two planes in a normal section through the gear is denoted at 29 in Fig. 3 and in a longitudinal section is denoted at 30 in Fig. 4.

A gear made according to the present invention differs from prior forms of non-generated tapered gears in that the axes of the side surfaces of the gear are not perpendicular to the root plane of the gear but are inclined at an angle of other than 90° to the root plane and it differs further in that opposite side surfaces of a tooth space of the gear are of equal pressure angle referred to the common axis of the side surfaces. The opposite side surfaces remain, however, of substantially equal pressure angle referred to the pitch plane of the gear.

Thus, from Fig. 3 it will be seen that the pressure angle $a$ of the side surface 14 of the tooth space 16 of the gear 10 is equal to the pressure angle $a$ of the side face 15 of this tooth space referred to the common axis 20 of the tooth sides. Further, it will be seen that the axis 20 is inclined at other than 90° to the root plane 27 of the gear.

Gears produced according to the present invention may be cut, then, with a face-mill gear cutter having inside and outside cutting blades of equal pressure angle referred to the axis of the cutter which corresponds to the axis 20. The axis of the cutter is inclined at other than a right angle to the root plane of the gear to be cut and the gear may be cut according to the principles set out in our copending application No. 724,504 of May 8, 1934.

In any section taken longitudinally of a tooth space of a gear produced according to the invention, the bottom land of the tooth space will be curved. For a spiral bevel gear, the bottom land 32 will be convex as shown in Fig. 4. Such a bottom land can be produced by employing the method of our pending application above referred to and adjusting the gear blank at other than its root angle to the axis of the cutter.

The bottom land of a tooth space may extend in the direction of the root cone of the gear or it may be perpendicular to the axis of the side surfaces of the tooth space. The former construction is shown in Fig. 5 and the latter in Fig. 6.

Fig. 5 shows a tooth space of a spiral bevel gear 40. The concave side of the tooth space is designated at 41 and the convex side at 42. The side surfaces 41 and 42 are coaxial conical surfaces with a common axis at 43. 44 denotes the root plane of the gear and 45 the pitch plane. 46 is the bisector of the angle between the sides 41 and 42 of the tooth space. The sides 41 and 42 are of equal pressure angle $a$ referred to the pitch plane 45 of the gear and the bottom land 47 of the tooth space extends in the direction of the root cone of the gear. The root plane 44 is tangent to this cone.

In Fig. 6, a spiral bevel gear 50 is shown, one of whose tooth spaces has concave and convex sides 51 and 52, respectively, which are coaxial conical surfaces with a common axis at 53. The root plane of the gear is denoted at 54 and its pitch plane at 55. 56 is the bisector of the angle between the sides 51 and 52 of the tooth space. The sides are of equal pressure angle, as before, referred to the pitch plane 55 of the gear, but the gear shown in Fig. 6 differs from the embodiment shown in Fig. 5 in that the bottom land 57 of the tooth space is perpendicular to the axis 53 of the sides of the tooth space.

The gear shown in Fig. 6 may be cut with a face-mill gear cutter whose tip-cutting edges lie in a plane perpendicular to the axis of the cutter. The gear shown in Fig. 5 may be cut with a face-mill gear cutter whose tip-cutting edges are inclined at different angles to the opposite side-cutting edges of the cutter. Usually the tip-cutting edges of the cutter are so inclined to the opposite side cutting edges of the cutter as to cut a bottom land 47, such as shown in Fig. 5, which makes equal angles $b$ with the opposite sides 41 and 42 of the tooth space of the gear at the root plane 44 of the gear.

It will be noted that with either form of spiral bevel gear shown, the bisector of a tooth space is inclined at an acute angle to the root plane.

Hypoid gears made according to the present invention are like prior forms of non-generated hypoid gears in that opposite sides of a tooth space are of unequal pressure angle referred to the pitch plane of the gear. They differ from prior forms of non-generated hypoid gears, however, in that the opposite sides of a tooth space are of equal pressure angle referred to the axis of the tooth sides. Heretofore, non-generated hypoid gears have had tooth spaces whose opposite sides were not only of unequal pressure angle referred to the pitch plane of the gear but of unequal pressure angle referred to the axis of the sides.

Fig. 7 shows a hypoid gear 60. 61 denotes the concave side of a tooth space of this gear and 62 the convex side of the tooth space. The sides 61 and 62 are coaxial conical surfaces having a common axis at 63. The root plane of the gear is denoted at 64 and the pitch plane at 65. 66 designates the bisector of the angle between the sides 61 and 62. The side surfaces 61 and 62 of the tooth space have unequal pressure angles $d$ and $e$ referred to the pitch plane 65 of the gear but they have equal pressure angles $f$ referred to their common axis 63. In the form of hypoid gear shown in Fig. 7, the bottom land of the tooth space lies in a plane 67 perpendicular to the common axis 63 of the tooth sides.

In Fig. 8 a hypoid gear 70 made according to a different embodiment of this invention is shown. The concave side of a tooth space of said gear is denoted at 71 and the convex side at 72. The two sides are coaxial conical surfaces with a common axis at 73. The root plane of the gear is denoted at 74 and the pitch plane at 75. The bisector of the angle between the two sides is denoted at 76. The two sides have unequal pressure angles $g$ and $h$ referred to the pitch plane of the gear but the sides are of equal pressure angle $i$ referred to the common axis 73 of the tooth sides. The gear shown in Fig. 8 differs from that shown in Fig. 7 in that the bottom land 77 of the tooth space extends in the direction of the root cone of the gear and the root plane 74 of the gear is tangent to the bottom land.

It will be noted that with either form of hypoid gear made according to the present invention, the pressure angle at the root line of the gear is smaller on the convex side of the tooth than on the concave side and that the bisector of the tooth space makes an obtuse angle with the root plane.

Hypoid gears made according to this invention have concave tooth bottoms in a section taken longitudinally of the tooth space as indicated at 80 in Fig. 9.

Hypoid gears may be cut according to the present invention by using a face-mill gear cutter having opposite side cutting edges of equal pressure angle referred to the axis of the cutter and positioning the cutter with reference to the gear blank so that the axis of the cutter coincides with the axis 63 or 73 of the tooth surfaces to be cut upon the gear. If it is desired to cut a gear with tooth bottoms perpendicular to the axis of the side surfaces of the tooth space, then a cutter will be employed having tip cutting edges lying in a plane perpendicular to this axis. If it is desired to have the bottom lands of the tooth spaces of the gear extend in the direction of the root cone, then a face-mill gear cutter will be employed having tip cutting edges inclined at unequal angles to the opposite side cutting edges of the tool at the correct angle to cut a bottom land such as shown on 77 in Fig. 8 which lies in the root cone of the gear.

While the invention has been described in connection with gears having conical side tooth surfaces, it will be understood that the invention applies also to gears having spherical side surfaces or other forms of surfaces of revolution. In general, it may be said that while the invention has been illustrated in connection with particular embodiments thereof, it is capable of still further modification and this application is intended to cover any variations or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. A tapered gear having longitudinally curved teeth and tooth spaces of tapering depth from end to end whose opposite side faces are conical and have their axes inclined at other than right angles to the root plane of the gear.

2. A tapered gear having longitudinally curved teeth and tooth spaces of tapering depth from end to end whose opposite side surfaces are surfaces of revolution and have their axes inclined at other than right angles to the root plane of the gear.

3. A tapered gear having longitudinally curved teeth and tooth spaces of tapering depth from end to end, each tooth space being bounded by coaxial conical surfaces whose axis is inclined at other than right angles to the root plane of the gear.

4. A tapered gear having longitudinally curved teeth and tooth spaces of tapering depth from end to end, each tooth space being bounded by coaxial surfaces of revolution whose axis is inclined at other than right angles to the root plane of the gear.

5. A tapered gear having teeth and tooth spaces curved longitudinally along circular arcs and of tapering depth from end to end, the opposite sides of each tooth space being coaxial and of equal pressure angles referred to their common axis.

6. A tapered gear having longitudinally curved teeth and tooth spaces of tapering depth from end to end, the opposite sides of each tooth space being coaxial conical surfaces and of equal pressure angles referred to their common axis.

7. A tapered gear having teeth and tooth spaces curved longitudinally along circular arcs and of tapering depth from end to end, the opposite sides of each tooth space being coaxial surfaces of revolution and of equal pressure angles referred to their common axis.

8. A tapered gear having longitudinally curved teeth and tooth spaces of tapering depth from end to end, the opposite sides of each tooth space being coaxial surfaces of revolution whose common axis is inclined at other than right angles to the root plane of the gear, said opposite tooth surfaces being of equal pressure angles referred to their common axis.

9. A tapered gear having longitudinally curved teeth and tooth spaces of tapering depth from end to end, the opposite sides of each tooth space being coaxial conical surfaces whose common axis is inclined at other than right angles to the root plane of the gear and which are of equal pressure angles referred to said common axis.

10. A spiral bevel gear having teeth and tooth spaces curved longitudinally along circular arcs and of tapering depth from end to end, the bottoms of which are convex from end to end and the sides of which are coaxial and of equal pressure angle referred to their common axis.

11. A spiral bevel gear having teeth and tooth spaces curved longitudinally along circular arcs and of tapering depth from end to end, the bottoms of which are convex from end to end and extend in the direction of the root cone of the gear and the sides of which are coaxial and of equal pressure angle referred to their common axis.

12. A spiral bevel gear having teeth and tooth surfaces curved longitudinally along circular arcs and of tapering depth from end to end, the sides of which are coaxial and of equal pressure angle referred to their common axis and the bottom lands of which lie in a plane perpendicular to said axis.

13. A hypoid gear having longitudinally curved teeth and tooth spaces of tapering depth from end to end, the opposite sides of which are coaxial surfaces of revolution and of different pressure angle referred to the pitch plane of the gear but of equal pressure angle referred to their common axis.

14. A hypoid gear having longitudinally curved teeth and tooth spaces of tapering depth from end to end, the opposite sides of each tooth space being coaxial conical surfaces of different pressure angle referred to the pitch plane of the gear but of equal pressure angle referred to their common axis.

15. A hypoid gear having longitudinally curved teeth and tooth spaces of tapering depth from end to end, the opposite sides of each tooth space being coaxial and of different pressure angle referred to the pitch plane of the gear but of equal pressure angle referred to their common axis, and the bottom of each tooth space being concave from end to end.

16. A hypoid gear having longitudinally curved teeth and tooth spaces of tapering depth from end to end, the opposite sides of each tooth space being coaxial and of different pressure angle referred to the pitch plane of the gear but of equal pressure angle referred to their common axis, and the bottom surface of each tooth space being concave and tangent to the root cone of the gear.

17. A hypoid gear having longitudinally curved teeth and tooth spaces of tapering depth from end to end, the opposite sides of each tooth space being coaxial and of different pressure angle referred to the pitch plane of the gear but of equal pressure angle referred to their common axis and the bottom land of each tooth space being perpendicular to said common axis.

ERNEST WILDHABER.
ALLAN H. CANDEE.